(12) United States Patent
Dalton et al.

(10) Patent No.: US 6,980,784 B1
(45) Date of Patent: Dec. 27, 2005

(54) SYSTEM AND METHOD OF REDUCING NOISE IN AN ELECTRONIC SHELF LABEL SYSTEM

(75) Inventors: Gary C. Dalton, Snellville, GA (US); Andrew J. Adamec, Buford, GA (US)

(73) Assignee: NCR Corporation, Dayton, OH (US)

( * ) Notice: Subject to any disclaimer, the term of this patent is extended or adjusted under 35 U.S.C. 154(b) by 412 days.

(21) Appl. No.: 10/270,935

(22) Filed: Oct. 15, 2002

(51) Int. Cl.$^7$ .................................. H04B 1/10
(52) U.S. Cl. ................ 455/296; 455/161.3; 455/226.3; 340/5.91
(58) Field of Search .................... 455/226.3, 226.2, 455/255, 254, 161.3, 340, 164.1, 164.2, 296, 455/307; 375/346, 350; 340/5.91, 5.92

(56) References Cited

U.S. PATENT DOCUMENTS

| | | | |
|---|---|---|---|
| 3,805,285 A * | 4/1974 | Kinjo et al. ................... 386/93 |
| 5,287,556 A * | 2/1994 | Cahill ......................... 455/266 |
| 5,454,010 A * | 9/1995 | Leveque ...................... 375/136 |
| 5,510,602 A | 4/1996 | Evans et al. |
| 5,640,683 A | 6/1997 | Evans et al. |
| 5,722,048 A | 2/1998 | Javitt |
| 5,758,064 A * | 5/1998 | Zimmerman et al. ........ 340/10.2 |
| 5,991,622 A * | 11/1999 | Henry, Jr. .................... 455/434 |
| 6,724,318 B2 * | 4/2004 | Goodwin et al. ......... 340/825.49 |

* cited by examiner

*Primary Examiner*—Edward F. Urban
*Assistant Examiner*—Adeel Haroon
(74) *Attorney, Agent, or Firm*—Paul W. Martin

(57) ABSTRACT

A system and method of reducing noise in an electronic shelf label system which shifts operation of the receiver away from noise frequencies. The system includes a controller for receiving signal levels and noise levels at different frequencies from a homodyne receiver, and for shifting operation of the receiver away from noise frequencies.

5 Claims, 2 Drawing Sheets

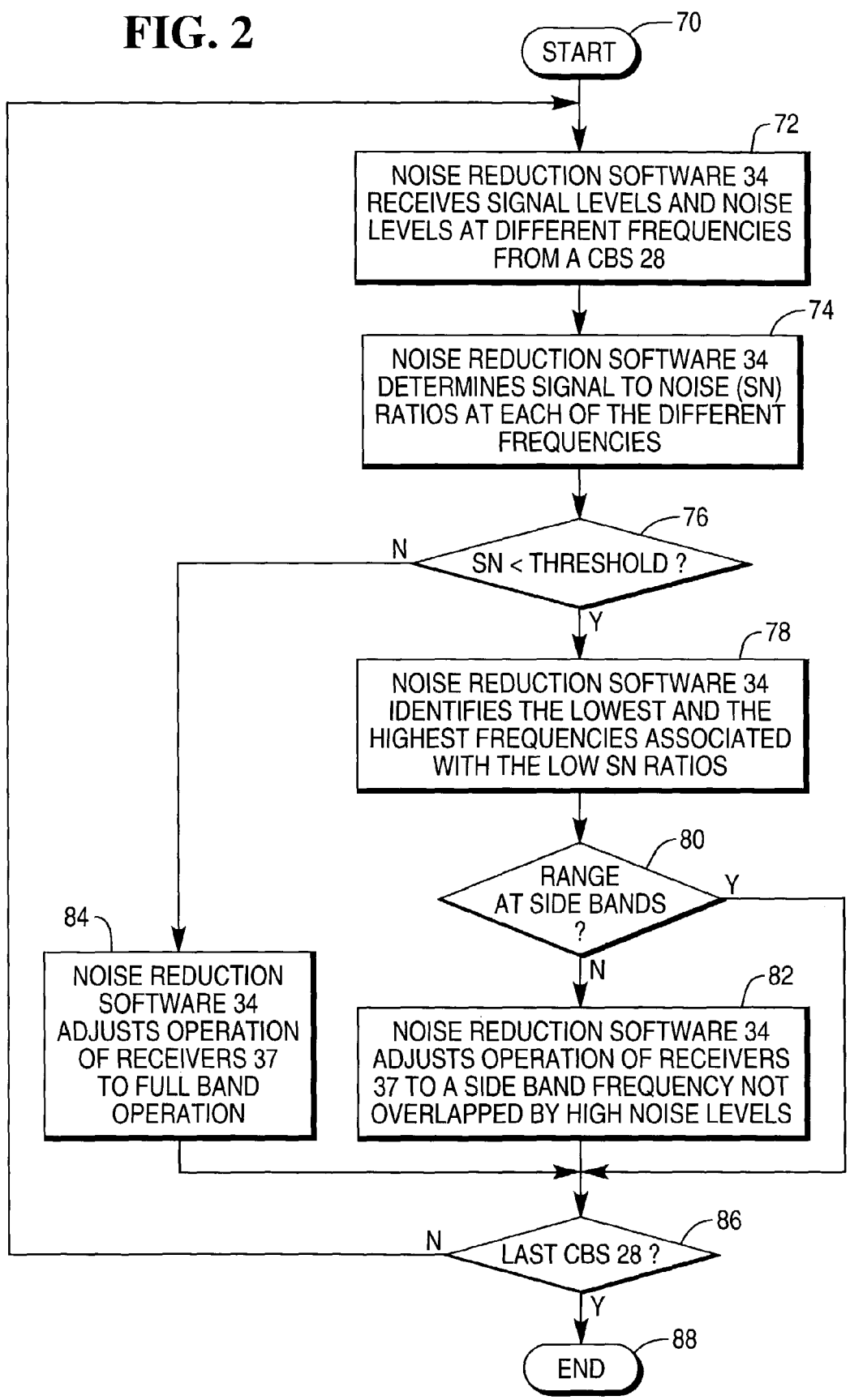

SYSTEM AND METHOD OF REDUCING NOISE IN AN ELECTRONIC SHELF LABEL SYSTEM

BACKGROUND OF THE INVENTION

The present invention relates to electronic shelf label (ESL) systems, and more specifically to a system and method of reducing noise in an electronic shelf label (ESL) system.

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items.

One type of ESL is disclosed in commonly assigned U.S. Pat. No. 5,510,602. This type of ESL takes advantage of modulated backscatter communication techniques disclosed in commonly assigned U.S. Pat. No. 5,640,683. Such systems may deal with noise using message pooling as disclosed in U.S. Pat. No. 5,722,048. These patents are all hereby incorporated by reference.

ESLs may be required to display information in many retail environments, including environments in which noise is present. Noise may come from other devices in the same frequency band, or devices that produce harmonics in the same frequency band. These sources of noise can cause system performance issues and hinder system integrity.

Therefore, it would be desirable to provide a system of method of reducing noise in an ESL system.

SUMMARY OF THE INVENTION

In accordance with the teachings of the present invention, a system and method of reducing noise in an electronic shelf label (ESL) system is provided.

The system includes a controller for receiving signal levels and noise levels at different frequencies from a homodyne receiver, and for shifting operation of the receiver away from noise frequencies.

A noise reduction method includes the steps of receiving signal levels and noise levels at different frequencies from a homodyne receiver, and shifting operation of the homodyne receiver away from noise frequencies.

Shifting operation may include the steps of determining signal to noise ratios at each of the different frequencies, comparing the signal to noise ratios to a minimum threshold signal to noise ratio, receiving only side band frequencies if one of the signal to noise ratios is lower than the minimum threshold signal to noise ratio.

It is accordingly an object of the present invention to provide a system and method of reducing noise in an ESL system.

It is another object of the present invention to provide a system and method of reducing noise in an ESL system which determines which part of the frequency contains noise and switches operation from full band processing to either upper or lower side band processing.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the method of the present invention.

DETAILED DESCRIPTION OF THE PREFERRED EMBODIMENT

Figure 1:
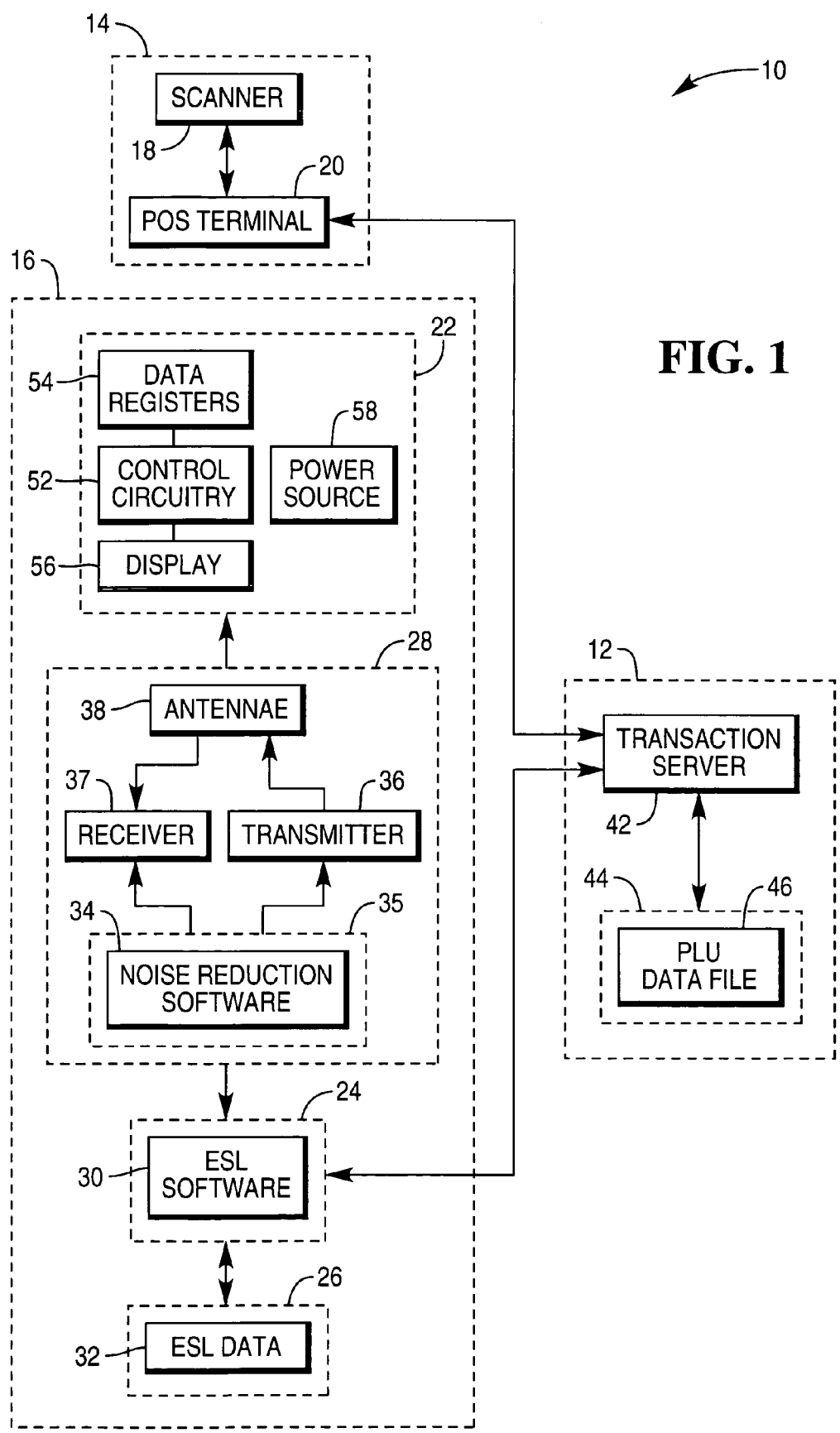
FIG. 1 is a block diagram of a transaction management system.

Referring now to FIG. 1, store system 10 primarily includes host computer system 12, point-of-sale (POS) system 14, and electronic shelf label (ESL) system 16.

POS system 14 includes bar code scanner 18 and terminal 20.

ESL system 16 primarily includes ESLs 22, host ESL terminal 24, ESL storage medium 26, and communication base stations (CBSs) 28.

ESLs 22 are typically attached to shelf units within a store. Each ESL 22 includes control circuitry 52, a number of data registers 54, a display 56, and power source 58.

Control circuitry 52 preferably includes all circuitry necessary for wireless communication with host ESL terminal 24. Control circuitry 52 may include an application specific integrated circuit (ASIC) and an antenna. Communication between control circuitry 52 and host ESL terminal 24 preferably includes modulated backscatter RF communication.

Data registers 54 contain data, usually the prices of items on the shelf. The data may also include symbols and phrases, such as promotional information associated with the items.

Display 56 may include a liquid crystal display (LCD).

Power source 58 is preferably one or more batteries.

Host ESL terminal 24 executes ESL software 30, which controls storage and display of ESL data 32. ESL software 30 sends data from ESL data 32 to ESLs 22 and determines whether correct information is being displayed by ESLs 22. For this purpose, ESL software 30 may check the displayed information against information in PLU data file 44.

ESL storage medium 26 stores ESL data 32 and is preferably a fixed disk drive.

CBSs 28 send messages from host ESL terminal 24 to ESLs 22 and receive messages to host ESL terminal 24 from ESLs 22. CBSs 28 are typically mounted to ceilings and connected to host ESL terminal 24 through wire cables.

CBSs 28 include controller 35, transmitter 36, receiver 37, and antennae 38. Controller 35 executes noise reduction software 34 which receives signal levels and noise levels at different frequencies receiver 37, and reduces noise by shifting the operation of receiver 37 away from the noise frequencies.

Receiver 37 may include a homodyne receiver, capable of full band operation or single side band operation. ESL terminal 24 controls operation of receiver 37.

Receiver 37 measures the energy level present in a used frequency. This measurement is called the signal level. The receiver also measures the energy present at other frequencies. This measurement is called the noise level.

Host computer system 12 includes transaction server 42 and storage medium 44.

Transaction server 42 distributes price and other information to POS terminals 20 and host ESL terminal 24.

Storage medium 44 stores PLU data file 44. PLU file 44 is preferably a primary location for storing item prices and other information.

Here, terminals 20, 24, and 42 are shown as separate components that are networked together, but they may also be combined in different ways. For example, ESL terminal 24 and transaction server 42 may be combined to form a single host computer. POS terminal 20 and transaction server 42 may be combined to form a POS terminal which doubles as a host computer for a network of other POS terminals.

Turning now to FIG. 2, the operation of noise reduction software 34 is illustrated in detail beginning with START 70.

In step 72, noise reduction software 34 receives signal levels and noise levels at different frequencies from a CBS 28.

In step 74, noise reduction software 34 determines signal to noise (SN) ratios at each of the different frequencies.

In step 76, noise reduction software 34 compares a SN ratio for each of the different frequencies to a minimum threshold SN ratio. If the SN ratios are all higher than the minimum threshold SN ratio, operation proceeds to step 84. Otherwise, operation proceeds to step 78.

In step 84, noise reduction software 34 adjusts operation of receivers 37 to full band operation. Operation proceeds to step 86.

Proceeding alternatively from step 76, noise reduction software 34 identifies the lowest and the highest frequencies associated with the low SN ratios in step 78.

In step 80, noise reduction software 34 determines where the range of frequencies associated with the low SN ratios falls in the frequency band of operation. If the range extends across both of the side bands, operation proceeds to step 86 without attempting to change the operation of receiver 37. Otherwise, operation proceeds to step 82.

In step 82, noise reduction software 34 adjusts operation of receivers 37 to a side band frequency not overlapped by high noise levels.

In step 86, noise reduction software 34 determines whether CBS 28 is the last CBS 28. If so, operation ends at step 88. Otherwise, operation returns to step 72 to process signal and noise levels from another CBS 28.

Although the present invention has been described with particular reference to certain preferred embodiments thereof, variations and modifications of the present invention can be effected within the spirit and scope of the following claims.

What is claimed is:

1. A noise reduction method for an electronic shelf label system comprising the steps of:
    (a) receiving signal levels and noise levels at different frequencies in a frequency band;
    (b) determining signal to noise ratios at each of the different frequencies;
    (c) comparing the signal to noise ratios to a minimum threshold signal to noise ratio;
    (d) if one of the signal to noise ratios is lower than the minimum threshold signal to noise ratio, receiving only side band frequencies including
    (d-1) determining a lowest frequency and a highest frequency associated with the low SN ratios;
    (d-2) determining that a range of frequencies bounded by the lowest and highest frequencies falls outside of the side band frequencies; and
    (d-3) receiving only the side band frequencies.

2. The method as recited in claim 1, further comprising the step of:
    (e) if all of the signal to noise ratios are higher than the minimum threshold signal to noise ratio, receiving any frequency in the frequency band.

3. A communication base station in an electronic shelf label system comprising:
    a homodyne receiver for receiving signals in a frequency band from electronic shelf labels; and
    a controller for receiving signal levels and noise levels at different frequencies in the frequency band, for determining signal to noise ratios at each of the different frequencies, for comparing the signal to noise ratios to a minimum threshold signal to noise ratio, and for causing the homodyne receiver to receive only side band frequencies if one of the signal to noise ratios is lower than the minimum threshold signal to noise ratio, including determining a lowest frequency and a highest frequency associated with the low SN ratios, determining that a range of frequencies bounded by the lowest and highest frequencies falls outside of the side band frequencies, and receiving only the side band frequencies.

4. A system for reducing noise in an electronic shelf label system comprising:
    a controller for receiving signal levels and noise levels at different frequencies in a frequency band from a homodyne receiver, for determining signal to noise ratios at each of the different frequencies, for comparing the signal to noise ratios to a minimum threshold signal to noise ratio, for receiving only side band frequencies if one of the signal to noise ratios is lower than the minimum threshold signal to noise ratio, including determining a lowest frequency and a highest frequency associated with the low SN ratios, determining that a range of frequencies bounded by the lowest and highest frequencies falls outside of the side band frequencies, and receiving only the side band frequencies.

5. The system of claim 4, wherein the controller is also for receiving any frequency in the frequency band from the homodyne receiver if all of the signal to noise ratios are higher than the minimum threshold signal to noise ratio.

* * * * *